United States Patent [19]

Savoyet et al.

[11] Patent Number: 4,755,815

[45] Date of Patent: Jul. 5, 1988

[54] ELECTRONIC IDENTIFICATION DEVICE

[76] Inventors: Jean-Louis Savoyet, Le Mayrie, F-38770 La Motte d'Aveillans; Alain Molé, 138, Avenue Ambroise Croizat, F-38400 Saint-Martin d'Heres, both of France

[21] Appl. No.: 609,316

[22] Filed: May 11, 1984

[30] Foreign Application Priority Data

May 11, 1983 [FR] France ................................ 83 08099
Jun. 16, 1983 [FR] France ................................ 83 10201

[51] Int. Cl.⁴ .......................... G06F 7/04; G06K 5/00

[52] U.S. Cl. .......................... 340/825.31; 340/825.32; 235/382; 361/172

[58] Field of Search ........... 340/825.3, 825.31, 825.32, 340/825.34; 235/380, 382.5, 382; 365/96; 361/172

[56] References Cited

U.S. PATENT DOCUMENTS

| | | | |
|---|---|---|---|
| 4,038,637 | 7/1977 | Peters . | |
| 4,412,216 | 10/1983 | Mole et al. | 340/825 |
| 4,481,513 | 11/1984 | Mole et al. | 340/825 |
| 4,486,751 | 12/1984 | Mole et al. | 340/825.31 |

FOREIGN PATENT DOCUMENTS

| | | |
|---|---|---|
| 0044039 | 1/1982 | European Pat. Off. . |
| 2266222 | 10/1975 | France . |
| 2353103 | 12/1977 | France . |
| 7726757 | 3/1978 | France . |
| 2374702 | 7/1978 | France . |
| 2471000 | 6/1981 | France . |
| 2503423 | 10/1982 | France . |
| 2506047 | 11/1982 | France . |
| 2506048 | 11/1982 | France . |
| 2513408 | 3/1983 | France . |
| 2545958 | 11/1984 | France . |
| 2547667 | 12/1984 | France . |

*Primary Examiner*—Robert L. Griffin
*Assistant Examiner*—Ralph E. Smith
*Attorney, Agent, or Firm*—Sandler & Greenblum

[57] ABSTRACT

The device consists of a key having a passive memory zone and a circulating register, the code contained in the passive zone being intended to be transferred to the circulating register when the key is introduced into a lock, so that the said code may be transferred from the circulating register to the lock to be compared there with a reference code contained in the lock. The key comprises a circuit which is provided with a counter which is incremented each time voltage is applied to the key and a system for resetting the counter to zero, when the code is successfully transferred from the key, so that after a number of attempts determined by the counter of unsuccessful transfer attempts, the passive memory zone is destroyed by the output signal emitted by the counter.

16 Claims, 11 Drawing Sheets

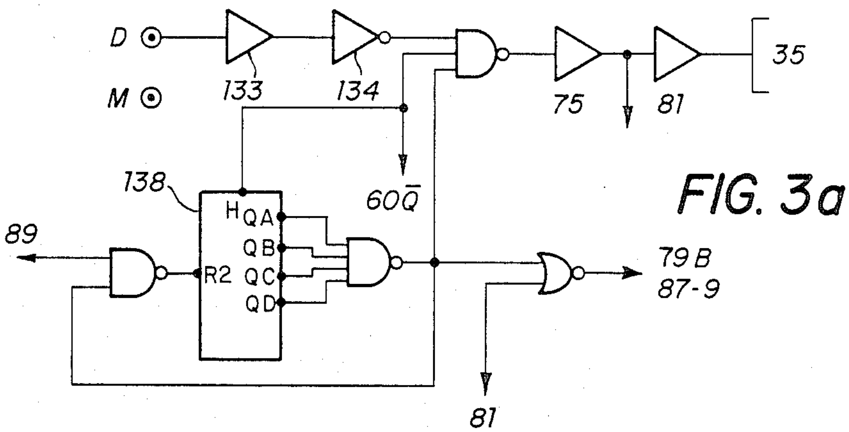
FIG. 3a
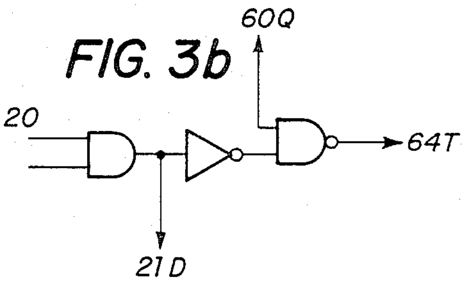
FIG. 3b
FIG. 3c
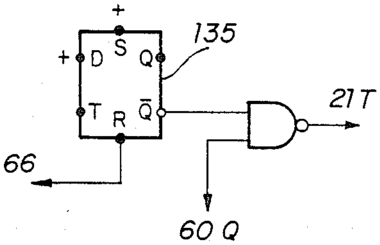
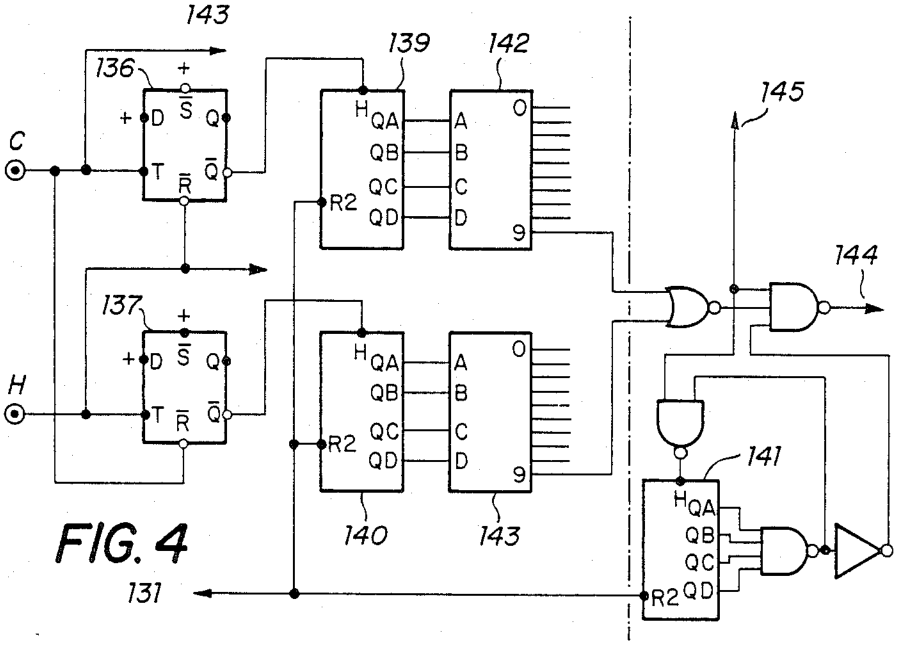
FIG. 4

ELECTRONIC IDENTIFICATION DEVICE

FIELD OF THE INVENTION

The present invention relates to an electronic identification device for identifying, for example, someone who attempts to operate a machine.

Devices for identifying people have numerous applications, such as for opening doors, supervising hourly-paid employees, controlling apparatus used by several people such as photocopying machines, or even for automatically dispensing money without counter-service being necessary.

BACKGROUND OF THE INVENTION

In certain identification devices, a removable part bearing an identification code is used in the form of a badge which the person to be identified carries with him.

The identification code may be embodied in the badge by perforations or by a magnetic tape and, beyond to the complexity of the reading apparatus, this allows the identification code to be easily detected by a prospective criminal.

In other identification devices a removable part in the form of an electronic key is used which has means for memorising an identification code which may be detected and recognised by a reading apparatus similar to a lock, but operating electronically (see, for example, U.S. Pat. No. 4,038,637).

In French Patent No. 2,363,837 a programmable memory key is used in which the identification code may be contained in a circulating register located in the key. The information contained in the key may be read by the electronic lock using pulses produced by a clock in the said lock. The information thus obtained is compared with a code memorised in the lock in order to determine the identity of the two codes and the instruction, for example, to open a catch.

However, in this device there is a great risk that the electronic key could be fraudulently duplicated as the circulating register which enables the identification code to be determined can be read relatively easily by a technician with a knowledge of this device.

Various improvements have been made to this device with a view to making the fraudulent detection of the identification code more difficult, such as random modifications of the code, both in the key and the lock. Although these means make fraudulent detection much more difficult, they do not completely rule it out.

BRIEF SUMMARY OF THE INVENTION

An object of the present invention is to provide an electronic code identification device, consisting of a mobile part and a fixed part, in which a fraudulent attempt to detect the code contained in the mobile part leads to the distruction of the code contained in the mobile part.

A further object of the present invention is the use of a keyboard which may be linked to the fixed part of the device to allow the holder of the mobile part to acknowledge the operational reaction of the fixed part.

Thus, the present invention provides an electronic identification device comprising a mobile part comprising a pre-programmed passive memory zone containing an electronic identification code, which is connected to a memory which may be read, and a fixed part to which the mobile part may be coupled and comprising means for supplying electric current, electronic means which are equipped to supply at least one loading pulse which causes the electronic identification code to be loaded into the memory and to be read by the said mobile part, electronic means for reading the content of the memory being read by the mobile part and transferred into a memory of the fixed part and comparison means for comparing, in the said fixed part the said content is transferred with a code which is contained in the said fixed part, and wherein the device comprises, in the mobile part, a circuit which is designed to destroy the said pre-programmed passive memory zone after a determined number N of unsuccessful attempts to read the code contained in the said pre-programmed passive memory zone.

The invention will be more clearly understood with reference to the preferred embodiment described below by example only.

BRIEF DESCRIPTION OF THE DRAWINGS

FIGS. 3 to 10 illustrate different variants of the embodiment of FIGS. 1 and 2;

FIGS. 11 to 14 illustrate further variants.

DETAILED DESCRIPTION

Figure 1:
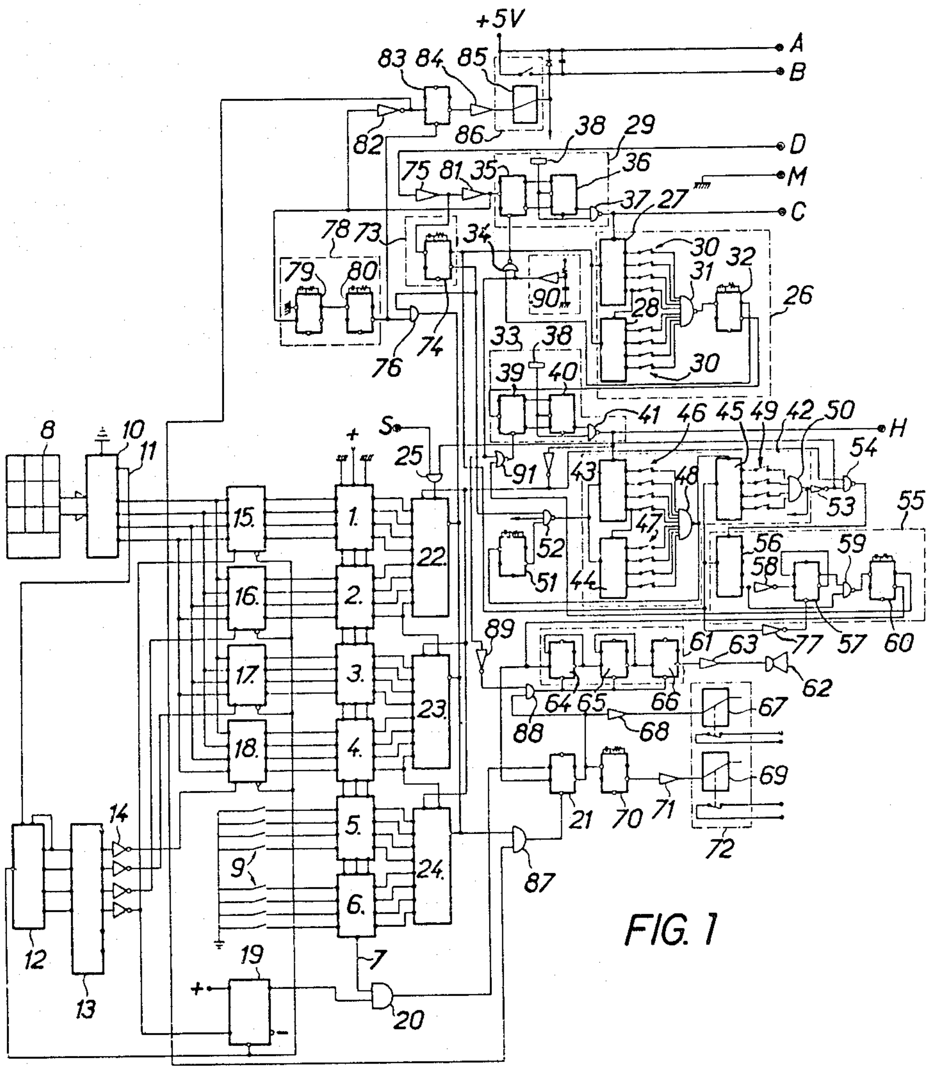
FIG. 1 shows the main elements of the fixed part or lock of an identification device intended for controlling the catch of a door.
Figure 2:
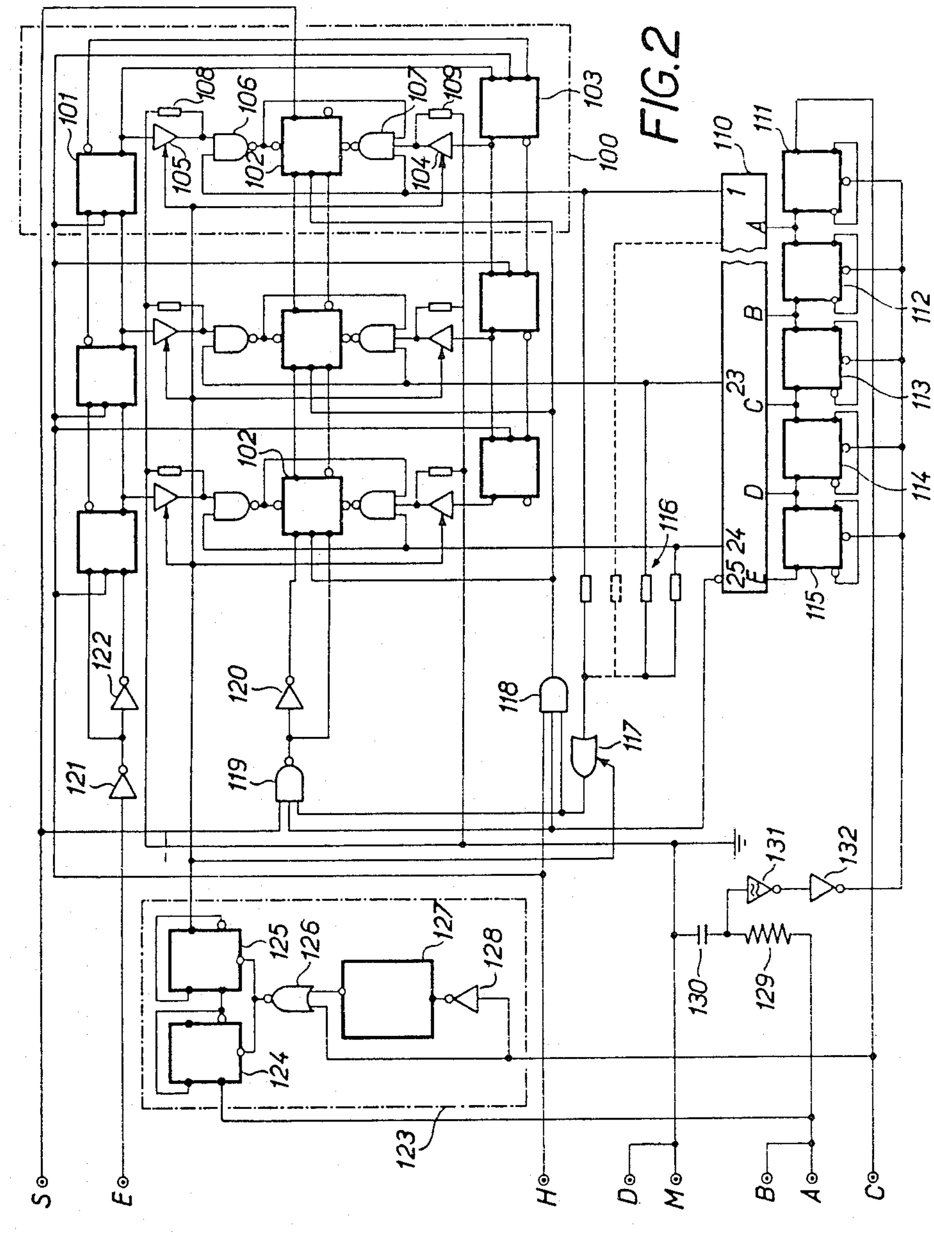
FIG. 2 diagrammatically shows the mobile part or electronic key which is intended to be coupled with the fixed part shown in FIG. 1.

Before describing in detail the fixed part according to FIG. 1 and the mobile part according to FIG. 2, we will briefly describe the manner in which these two parts co-operate.

The lock comprises two terminals A, B which, when the key is inserted into the lock, are designed to come into contact with two terminals A, B of the key. The two terminals A, B of the key are connected to each other and short-circuit the corresponding terminals of the lock which knows when a key has been inserted and which applies voltage to terminals A, B of the key, the key not being provided with an energy source.

The lock also comprises an earth terminal M which is intended to co-operate with an earth terminal M of the key, the earths of the lock and key thus being connected, and an output terminal D which is earthed in common with the corresponding terminal D of the key, when the key is inserted into the lock.

To synchronise the operations of the key and the lock, the lock comprises a clock which gives clock pulses to the key through a terminal H of the key.

The lock also comprises a loading terminal C through which the lock, by means of a corresponding terminal C of the key, gives the key the order to transfer its code to the lock, in order to effect a comparison with the code in the lock. The code is transferred by the corresponding terminals S.

The key also comprises a terminal E which does not have a corresponding terminal in the lock and which is simply for the introduction into the key of the code given to the key-holder.

As the codes to be compared have twenty-four bits in our Example, the lock comprises a series of six comparators 1-6, each of which has four bits, the result of the comparison appearing at the terminal 7 of the comparator 6. Of the twenty-four bits, sixteen bits are introduced by a keyboard 8 and eight bits by as many break switches 9.

The keyboard system comprises, in addition to the keyboard 8, a coding circuit 10. The code B C D (decimal binary code) of the activated digit is placed on the four terminals A,B,C,D of the coder 10. A pulse emitted by a terminal 11 of the coder 10 prevents the data from being given, a counter 12 being activated by this order which, when decoded by element 13 and the inverters 14, causes a buffer memory 15 to be loaded with the first digit which is positioned on channel $A_1$–$A_4$ of the comparator 1. A second digit is called which positions itself likewise on the channel $A_1$–$A_4$ of the comparator 2 by means of a buffer memory 16, and so on up to the 4th digit, with the assistance of the buffer memories 17, 18. A control authorization is thus sent to a trigger circuit 19 which, at gate 20, allows the information from the terminal 7 of the comparator 6 to pass. If the result of the comparison is positive, a trigger circuit 21 is activated, and if not there is an indication of an error and the operation has to be re-started. It should be understood that the key has to be engaged before the code is entered.

The channels $B_1$–$B_4$ of the comparators 1 to 6 are fed by the outputs $Q_A$–$Q_H$ of three circulating registers 22, 23, 24 which are themselves fed from terminal S, gate 25 and input E of the first register 22. It can therefore be seen that the identification code contained in the key according to FIG. 2 is introduced in series into the three registers 22–24 to be compared with the code in the lock.

The lock comprises a loading modulation circuit 26 consisting of two counters 27, 28, the counter 27 receiving the loading pulses emitted by a loading circuit 29 at the inlet H thereof. The outlets $Q_A$–$Q_D$ of the two counters 27, 28 are connected to two groups of four break switches 30 which are connected to eight inputs of a NON-ET gate 31. The output of the gate 31 is connected to the input $\overline{A}$ of a monostable 32, the output $\overline{Q}$ of which is connected to the input of a reading circuit 33. The output Q of the monostable 32 is connected, by means of a gate 34, to the zero re-set inlet $\overline{R}$ of a first trigger circuit 35 of the loading circuit, which comprises, moreover, a second trigger circuit 36, a gate 37 and a clock circuit 38.

Regarding the reading circuit 33, it comprises two trigger circuits 39, 40, a gate 41 and the clock circuit 38 which has already been mentioned. It can be seen that the reading circuit 33 supplies the terminal H of the lock with the clock pulses.

The output of the reading circuit 33 is, moreover, connected to the input of a lock modulation circuit 42 which comprises a group of three counters 43, 44, 45, four break switches 46 which may be pre-programmed and connected to the outputs $Q_A$, $Q_B$, $Q_C$, $Q_D$ of the counter 45, four break switches 47 which may also be pre-programmed and connected to the outlets $Q_A$–$Q_D$ of the counter 44, a NON-ET gate 48 the eight inputs of which are connected to the eight break switches and the output of which is connected to the input H of the third counter 45, the outputs of which also co-operate with four break switches 49. The four break switches 49 are connected to the four inputs of a NON-ET gate 50 which also comprises the clock modulation circuit 42.

The arrangement of these different means results in the output of the gate 50 emitting a signal after a number of clock pulses or reading pulses have been emitted by the circuit 33 which is dependent on the position of the various break switches 46, 47, 49. The number which is defined by the first two counters 43, 44 correspond to the number of reading pulses within a cycle, the number defined by the counter 45 corresponding to the number of cycles. The total number which is defined by the entire modulation circuit 42 is the product of these two numbers.

The output of the gate 48 is also connected to the input $\overline{A}$ of a monostable 51, the output $\overline{Q}$ of which is connected to one of the inputs of a NON-ET gate 52 which causes the counters 43, 44 to be reset to zero by the inputs R thereof when a signal is emitted by the gate 52. Thus, the first two counters 43, 44 are reset to zero after each cycle counted by the third counter 45.

When the number, thus determined, of reading pulses has been emitted by the reading circuit 33, the output signal of the gate 50 which is transmitted by the inverter 33 appears at an input of the gate 25, the other input of which is connected to the input terminal S which receives the output signal of the key. In this manner, the code which is contained in the key can only be introduced into the circulating registers 22, 23, 24 after the determined number of reading pulses have been emitted by the clock modulation circuit 42. The output of the inverter 53 is also passed to one of the inputs of a NON-ET gate 54 which receives the clock pulses emitted by the reading circuit 33 on the second inlet thereof.

In other words, after a determined number of exchange permutations caused by the clock pulses, the number of which is determined by the three counters 43, 44 and 45, new reading pulses, still emitted by the reading circuit 33 and passing through gate 54, are transmitted to the input of a reading stop circuit 55. This latter circuit comprises a counter 56, the outlet $Q_D$ of which is connected to the input T of a trigger circuit 57 by means of an inverter 58. It also comprises a NON-ET gate 59, the inputs of which are connected to the output $Q_D$ of the counter 56 and to the output Q of the trigger circuit 57 respectively. The output of the gate 59 is passed to the inlet $\overline{A}$ of a monostable 60 which causes a signal which stops the reading circuit 33 to be emitted.

The lock also comprises a circuit for authorising successive attempts 61, the output of which is connected to an alarm device 62 by means of a driver 63, and which is activated after four successive unsuccessful attempts. This circuit comprises three trigger circuits 64, 65 and 66 the input T of the first of which is controlled by the output Q of the reading stop-circuit 55. The output of the reading stop-circuit 55 is also passed to the inlet T of the gate 21, which on the one hand controls a relay 67 by means of a driver 68, this relay 67 intended to assume permanent control, and on the other hand a relay 69 by means of a monostable 70 and a driver 71, the relay 69 being intended to assume transitory control. The combination 72 of the two relays 67, 69 thus forms the power stage of the lock, the relay 67 being able to control, for example, a catch or the ignition of a vehicle and the relay 69 being able to control, for example, the starter of the vehicle.

The lock also comprises a first circuit 73 for re-setting to zero, which is provided with a monostable 74 which receives the signal of a time switch 75 at the input $\overline{A}$ thereof. The monostable 74 reacts to a signal having a descending front, that is to say on the connection of the key, as a result of earthing the terminal D. The output $\overline{Q}$ of the monostable 74 is connected to one of the inputs of an ET gate 76, the output signal of which causes the three registers 22, 23 and 24 to be reset to zero. The outlet $\overline{Q}$ of the monostable 74 is also connected to one of the inputs of the gate 52, the output of which resets the counters 43 and 44 to zero. The output Q of the monostable 74 serves to reset to zero the counters 27, 28 of the load modulation circuit 26 and the counters 45, 56 and the trigger circuit 57, the latter by means of an inverter 77.

A second circuit 78 for resetting to zero causes all the trigger circuits and the counters to be reset to zero and the current to be cut when the key is removed. This circuit comprises two monostables 79, 80 which are cascade-mounted, the output $\underline{Q}$ of the monostable 79 being connected to the input $\overline{A}$ of the monostable 78. The monostable 79 receives the output signal of a time switch 81 at the input B thereof and reacts to a signal which has a mounting front, that is to say on disconnection of the key. The output $\overline{Q}$ of the monostable 80 which produces a very brief pulse is connected to the other input of the gate 76, which causes, as has been said before, the registers 22, 23 and 24 to be reset to zero. The output $\overline{Q}$ of the monostable 80 is also connected to one of the inputs of the gate 76.

When the key is disengaged, the signal at the output of the time switch 81 which is passed by means of an inverter 82 to the input T of a trigger circuit 83, causes means of an amplifier 84 a relay 85 of a supply circuit 86 to be triggered so that the supply is cut. The trigger circuit 83 is reset to zero by the input $\overline{R}$ thereof which is connected to the output $\overline{Q}$ of the monostable 80 when the key is disengaged from the lock. An ET gate 87 receives the signal from the inverter 82 on one of the inputs thereof and the signal from the gate 76 on the other input thereof. The output signal of the gate 87 allows the trigger circuit 21 to be reset to zero when the key is disengaged on expiry of the time-delay of the time switch 81.

The trigger circuits 64, 65 and 66 of the circuit for authorising successive attempts 61 are reset to zero by an ET gate 88, one of the inputs of which is supplied by the output $\overline{Q}$ the trigger circuit 21 and the other input is supplied by an inverter 89, which is itself supplied by a circuit 90 which also supplies the gate 34 and a gate 91 for resetting the trigger circuit 39 to zero.

Before describing how the lock according to FIG. 1 operates, we shall now describe the key shown in FIG. 2 which is designed to co-operate with the lock.

The key comprises seven terminals, A,B,C,D,H,S,M which engage with the terminals of the lock which have the same reference numerals. It also comprises a terminal E which is to allow the code to be introduced into the key. It should be noted that the key does not contain any power source, the power being supplied to the key by the lock, with the aid of terminals A and B. The key contains a code having the same number of bits as the lock, that is twenty-four, this code corresponding to as many cells 100, only three of which have been shown. These cells 100 are connected in a cascade and each of them comprises three trigger circuits R - S 101, 102, 103, two three-state drivers 104, 105 and two NON-ET gates 106, 107. Each also comprises two fuses 108, 109 which may be burnt out according to the code desired.

One of the inputs of each of the gates 106, 107 is controlled by an output 1-24 of a decoder 110 having five inputs A,B,C,D,E which are controlled by the outlets Q of five trigger circuits 111–115 which form a circulating register. The twenty-four outputs of the decoder 110 are also connected to one of the terminals having twenty-four fuses 116, the other terminals of which are connected in parallel to the input of a three-state gate 117. The output of this latter gate supplies one of the inputs of an ET gate 118 having three inputs the output of which is connected in parallel to all the inputs K of the trigger circuits 102 and a NON-ET gate 119 having three inputs, the output of which supplies the input R of the trigger circuit 102 of the cell 100 which is connected to the output No. 24 of the decoder and, by means of an inverter 120, to the input S of this same trigger circuit 102. The terminal E is connected to the input R of the trigger circuit 101 of the cell 100 which co-operates with the terminal 24 of the converter 110 by an inverter 121 and to the input S of this same trigger circuit by a second inverter 122.

The key also comprises a system 123 for limiting the number of authorised attempts and which, if the number is exceeded, causes the key to be destroyed.

This system 123 comprises a counter formed by two trigger circuits 124, 125, the input T of the trigger circuit being connected to the terminals A,B of the key and the output terminal Q of the trigger circuit is connected to the control of the three-state circuits 105 and 117. The terminals for resetting the trigger circuits to zero 124, 125 are controlled by a NON-OU gate 126, one of the inputs of which is controlled by the load terminal C and the other is controlled by the output $\overline{Q}$ of a divider by twenty-four 127, the input H of which is supplied by an inverter 128, the input of which is connected to the terminal C.

To initialise the trigger circuits 111–115, the key also comprises an integrating circuit comprising a resistor 129 and a condenser 130, the resistor being connected to the terminals A, B and the intermediate point being connected to two elements 131, 132, the output of the inverting element 132 of which controls the initialisation terminals $\overline{R}$ of the trigger circuits 111–114.

The identification device shown in FIGS. 1 and 2 operates as follows: When the key is introduced into the lock, voltage is applied to both of them, the two terminals A and B being short-circuited. The clock circuit 38 which is positioned in the lock emits a series of pulses. After a time delay determined by the time switch 75, a signal produced by the monostable 74 produces a pulse which resets to zero different elements of the lock. The output of the second time switch emits a signal which after a second time delay causes negative bad pulses to be emitted by the load circuit 29, which pulses are passed to terminal C. These pulses appear at the inputs of the circulating register 111–115 which activates the decoder 110 which causes the circulating register consisting of the trigger circuits 102 of the cells 100 to be loaded.

The load pulses emitted by the circuit 29 are also passed to the input of the counter 27, 28 which consists of the load modulation circuit 26. Depending on the predetermined position of the break switches 30, it is therefore possible to cause a determined number of load pulses to be emitted. Indeed, as soon as the number determined by the position of the various break switches 30 has been reached, a signal is emitted by the gate 31 and the monostable 32 which causes the load circuit to be stopped by means of the gate 34.

When a fraudulent attempt is made to reproduce the key by reading, the emission of a number of load pulses greater or smaller than the normal number causes the content of the circulating register consisting of the trigger circuits 102 to be altered.

After the determined number of load pulses has been emitted, the circulating register formed by the trigger circuits 102 contains a determined code and the output signal of the circuit 26 which is emitted by the monostable 32 does not only cause the load pulses to be stopped but also causes the clock pulses to start to be emitted by the reading circuit 33. These pulses appear at terminal H and, by means of the gate 118, enable the content of the various elements 102 in the circulating register of the key to be read in series. The reading pulses are counted by the reading stop-circuit 55 so as to be equal to twenty-four, in the example shown, that is to the number of bits of the circulating register consisting of the trigger circuits 102

The signal series appearing on terminal S which is passed to the circulating registers 22, 23 and 24 is compared, in the comparators 1–6, with the code which is partially embodied by the break switches 9 and partially by the outputs of the other buffer memories 15, 16, 17 and 18. These break switches have all been shown open but it is clear that some of them are in fact closed.

When the comparison is positive an output signal is emitted by the comparator 6. A pulse is produced by the trigger circuit 21 which enables the relay 67 to be permanently controlled and the relay 69 to be temporarily controlled.

It can be seen in FIG. 2 that the circulating register formed by the trigger circuits 102 is closed on itself, the output appearing at terminal S being re-applied by gates 119 and 120 into the first element 102 of the register. The outlet of the gate 50 of the clock modulation circuit 42 emits a signal after a number of clock pulses have been emitted by the circuit 33 which is dependent on the position of the various break switches 46, 47 and 49. The number defined by the first two counters 43, 44 corresponds to the number of readihg pulses within a cycle. The number defined by the counter 45 corresponds to the number of cycles. The total number defined by the entire circuit 42 is equal to the product of these two numbers. It can also be seen that the first two counters 43, 44 are reset to zero after each cycle counted by the counter 45.

When the determined number of reading pulses has been emitted by the reading circuit 33, the output signal of the gate 50 which is transmitted by the inverter 53 appears on the first input of the gate 25, the second of which is connected to the terminal S which receives the output signal of the key register formed by the trigger circuits 102. In this manner, the content of the said register can only be compared after the determined number of reading pulses has been emitted by the clock modulating circuit 42.

The output of the gate 50 is also passed to one of the inputs of the gate 54 which receives the clock pulses emitted by the circuit 33 on the second input thereof.

Thus, after a determined number of permutations caused by the clock pulses, the number of which is determined by the three counters 43, 44 and 45, new reading pulses, also emitted by the reading circuit 33 and passing through the gate 54, are transmitted to the input of the reading stop-circuit 55.

The identification code formed by fuses which are or are not burnt out is loaded by means of a determined number of load pulses emitted by the load circuit 29, and the identification code contained in the circulating register formed by the trigger circuits 102 is modified when a pulse is emitted onto the outlet 25 of the decoder 110. Thus the code contained in the circulating register is modified as a function of the number of load pulses.

After a suitable number of load pulses have been emitted, the reading circuit 33 is put into operation and a number of pulses determined by the three counters 43, 44 and 45 is sent to the terminal H. Each of these pulses causes a permutation of the content of the circulating register, formed by the trigger circuits 102. It should be noted that during these various permutations, the signal appearing at the output terminal S is not introduced into the registers 22, 23 and 24 as a result of the gate 25 which blocks the inlet thereof so long as no signal is emitted at the output of the gate 50. When this permutation phase is over, the gate 25 allows a number of reading pulses equal to the number of bits of the circulating register formed by the trigger circuits 102 to pass, with a view to reading the content thereof. An object of the circuit 123 is to cause the key to be destroyed when a fraudulent attempt is made to find the code. Each time voltage is applied to the key, the counter 124, 125 is incremented unless it is reset to zero by the correct number of load pulses passed to the terminal C. Thus, when voltage is applied for the fourth time without the counter being reset to zero during this time, a high level appears at the output Q of trigger circuit 125. This high level is passed to the control terminal of each of three-state elements 104 and 105 causing the degree of conduction of each to increase beyond the degree that occurs when the level on the control terminals is low. When elements 104 and 105 conduct at their higher level, the resultant current that flows from terminals Q of flip-flops 103 and 101, respectively, through fuses 108 and 109 to ground will be such that the fuses will be destroyed.

Numerous variants may be designed within the scope of the present invention, which ensure that the pre-programmed passive memory zone is destroyed after a determined number N of unsuccessful attempts to read the code contained in the said pre-programmed passive zone.

It is clear that the above number N should not take into account unsuccessful attempts due to the defective operation of the electronics, defects due, for example, to industrial action. An improvement consists of starting the recognition operation of the mobile part several times and calculating a statistic to give an agreement for use.

The mobile part is examined, for example, ten times and agreement is only given if the result is positive in at least nine cases. After two errors, the cycle continues and the errors are placed in the buffer memory; after ten cycles, agreement is not given and the fraudulent individual who was reading in line would be unaware when the error took place.

FIGS. 3A, 3B, 3C show the modifications to be made to the diagram of the fixed part shown in FIG. 1.

For an examination number of ten, for example, so that the system cannot be detected by an exact reproduction of each examination, each of the load modulations and the clock modulations has to be modified in a random manner if possible. Thus, at each rotation, the state of 30 and/or 46, and/or 47, and/or 49 has to be modified and consequently the monostable 60 has to be connected to the clock input of a counter by ten in this example. This signal also triggers off the output order via a gate which is destroyed on the last cycle. The errors are always analysed by the element 61 which gives the alarm on the fourth error.

FIG. 3 clearly shows the modifications which are necessary to the fixed part.

In the mobile part, the programme either has to be changed on each rotation of the system, as in the fixed part, or the different modulations have to be programmed so that they give an identical result to these passages.

In the first case, the programme may be changed for the clock modulation by the first mounting front of the load; and for the load modulation by the first mounting front of the clock. The trigger circuits are also reset to zero in a staggered arrangement.

The part on the left hand side of FIG. 4 clearly shows the modifications to be made to the diagram of the mobile part according to FIG. 2.

The above system may also be put into the mobile part (FIG. 4).

An interesting use of the present invention is the memory credit card. Therefore, it is possible in a variant to create a so-called "directorial" fixed part, that is that only one fixed part can read all the mobile parts to check the content of these mobile parts.

Thus it would suffice to put the same code in all the mobile parts which are to be tested by this fixed "directorial" part and to put the decoder in the fixed part and which is assignable thereto while not taking the confidential code of each mobile part into account. In contrast, it could also check the confidential number of the individual for giving, for example, the information in the mobile part, that is the debits, the credits, and the dates and finally a complete file of the mobile part, this file even allowing a ticket to be provided by a printing drum. Thus the mobile part which already has a code programmed in it, that is the recognition code, may contain different programmable registers of various types as a function of the means which are used.

FIGS. 5 to 10 illustrate different variants of the fixed and mobile parts.

According to yet another variant, the mobile part may comprise a use-counter which increments itself at each use and stores this count in its memory to enable it to know if someone has used the mobile part thereof without realising it. This count may be made by a fuse system or by programming an EPROM.

It is clear that a reader for this counter has to be provided in the fixed part; this could be in the so-called "directorial" device, specified above.

This new code could be read at the end or at the beginning of the recognition code, a control zone being provided to this end.

In a further variant it is possible to provide a mobile "hierarchical" part, that is wherever, for example, the mobile part consists of a key intended for opening a door, the so-called "directorial" mobile part would be able to open all the gates, the mobile "sub-directorial" part only opening half the gates etc., right up to the client who can only open his own door. This is worthwhile in a hotel or hospital etc.

In yet another variant, different memory zones in the mobile part may be used with or without a complementary code (keyboard), and the same mobile part may have zones conditioned for the input of a complementary code, involving other phases; the complementary code, for example, would be required to withdraw money whereas it would not be necessary for a motorway toll or for a telephone.

A mobile part may have as many zones as required, for example one per financial establishment and n financial establishments: in this case the recognition of each zone could be the purpose of the fixed part which would automatically make the choice, for example for withdrawing money at a bank cash-box. The memory zone may be selected using the first loading bits and the first clock bits, during the first recognition cycle, for example. Selection is carried out in the mobile part. Decoding these bits gives the address of the memory zone to be used. The secret code for carrying out transactions may be the same for all the memory zones but may change as a function of the address given by first "loading-clock" cycle. As the address of the code is also given by the first cycle, there is therefore only one part of a cycle which is common to all systems.

The selection of the memory zone could also require a signal caused by manual intervention, at the level of the mobile part by a push button situated opposite the selected zones or, in most cases, a push button which is integral with the fixed part.

Example of use: a large-surface type cash register having various numbered keys, such as, 1,2,3,4, in a very accessible manner . . . the mobile part has a certain number of indexed zones 1,2,3,4, . . . and facing this the number of a financial establishment. On use, the holder of the mobile part chooses the zone, in real life the bank, for example, zone No. 2 corresponding to bank X, and on introduction of the mobile part presses on button No. 2 of the cash register; thus zone 2, corresponding to bank X, is debited.

The interest in this extremely flexible system allows a given user to have banks W,X,Y,Z and another to have banks Q,R and S, each zone being alloted a number which also appears on the cash box, and therefore a cash register may thus accept cards from various banks, in the way that cheques from various banks are presently acceptable.

Instead of allowing a memory of a mobile part to be read, operating, for example, like a credit-debit card, by introducing it into a fixed part, as seen above, the mobile part may have a liquuid crystal display, or the user may have a receiver system into which he puts the mobile part.

Returning to FIGS. 3 and 4, the encircled reference numerals correspond to the elements in FIGS. 1 and 2 respectively, thus enabling modifications to be located.

Elements 133 and 134 act as time-delays, elements 136 and 137 are trigger circuits, elements 138, 139, 140 and 141 are counters and elements 142 and 143 are decoders. The other elements consist of simple gates and the usual symbols have been used for them. The conductors 143,144 and 145 respectively go towards the loading, use and programme input of a memory.

Figure 5:
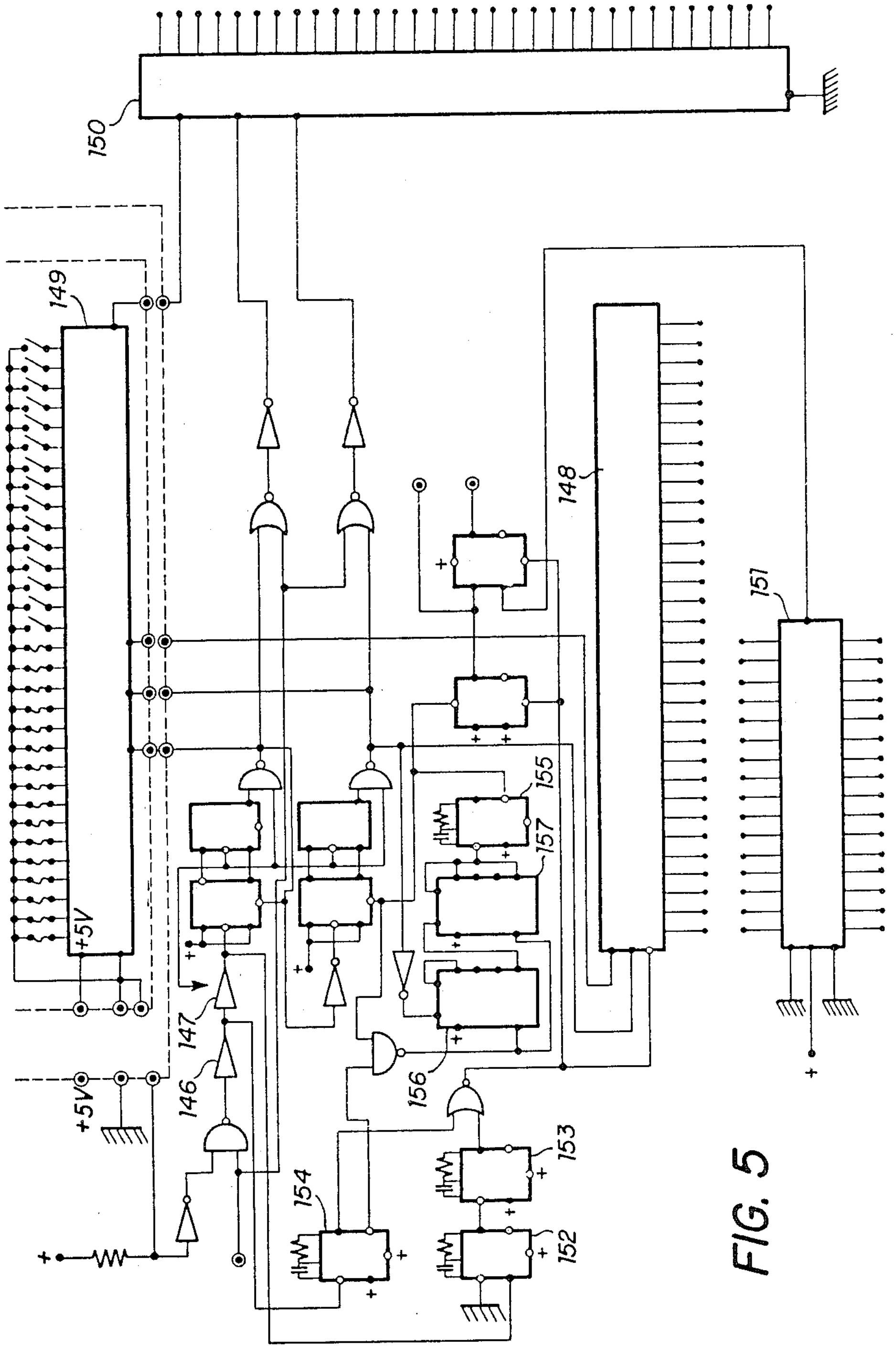

FIG. 5, which shows a circulating register, having variable code programming on demand, the elements are time-switches, elements 148, 149 and 150 are circulating registers, series-parallel at 148 and parallel-series at 149 and 150, while element 151 is a comparator. Elements 152,153,154 and 155 are monostables and elements 156 and 157 are counters. The other elements are either trigger circuits or gates shown in a conventional manner.

Figure 6:
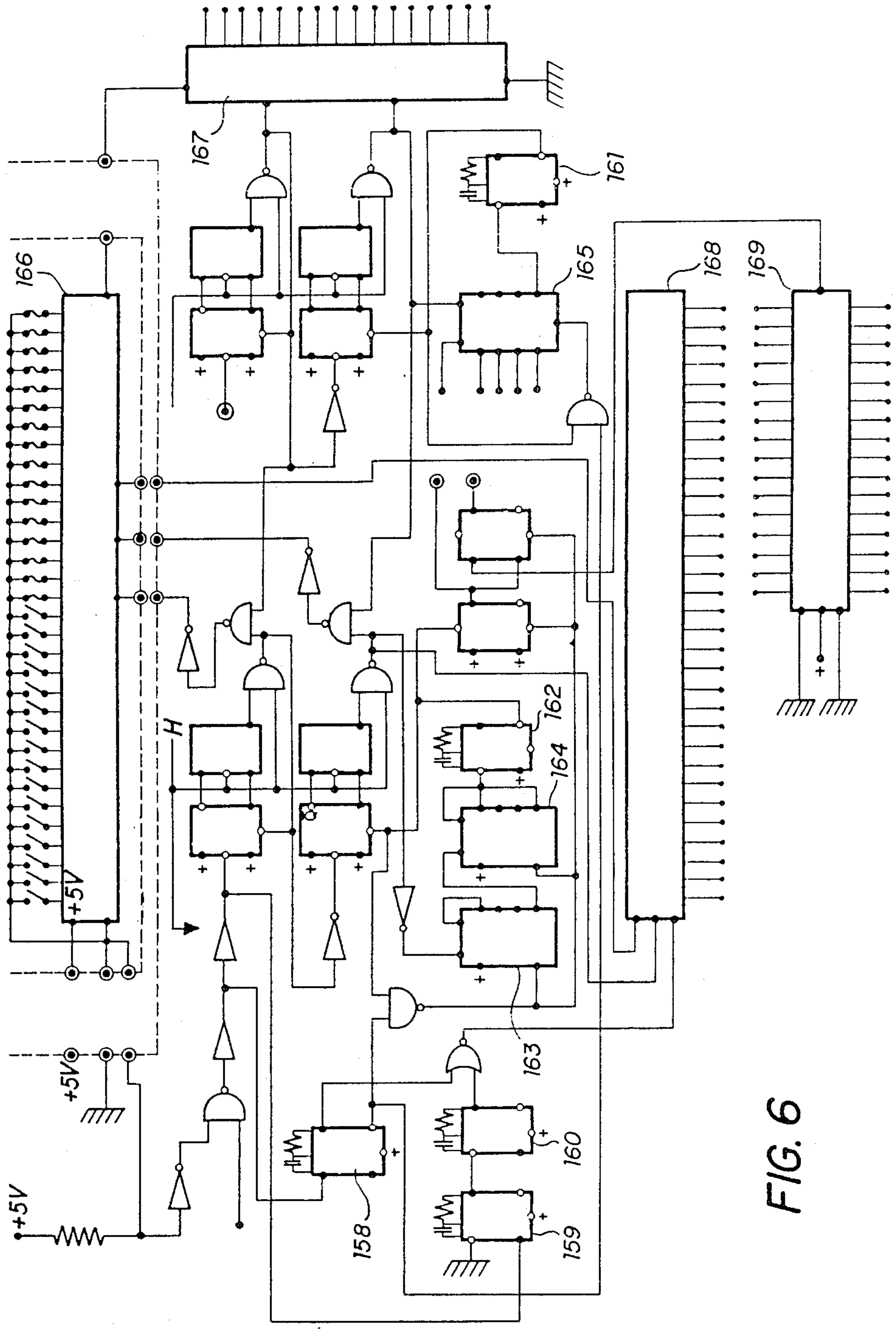

FIG. 6, which also shows a circulating register, having variable code programming on demand, 158,159,160,161 and 162 are monostables, 163,164 and 165 are counters, 166 and 167 are parallel-series circulating registers, 168 is a series-parallel circulating register, 169 is a comparator, and the other elements, which are not shown, are trigger circuits or gates.

Figure 7:
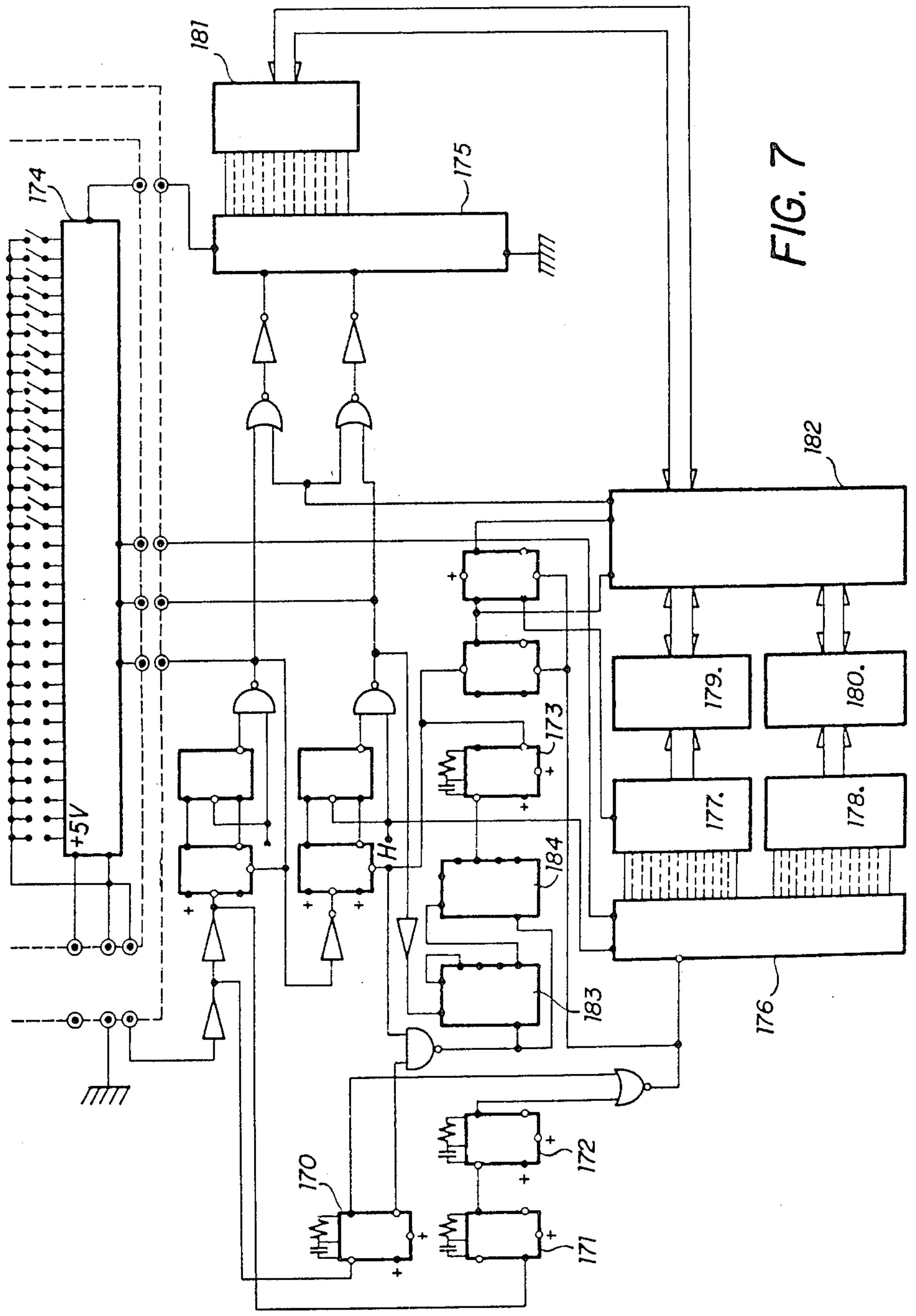

FIG. 7 shows a system for programming the code loading having a fixed number of writing bits and writing control bits which are synchronous with reading, 170,171, 172 and 173 are monostables, 174,175 are parallel-series circulating registers, 176 is a series-parallel circulating register, 177,178 are a comparator and a memory and 179,180 and 181 are PIAs, 182 is a microprocessor, and 183 and 184 are counters. The other elexents are gates, trigger circuits, time-switches or inverters shown in a conventional diagrammatical manner.

Figure 8:
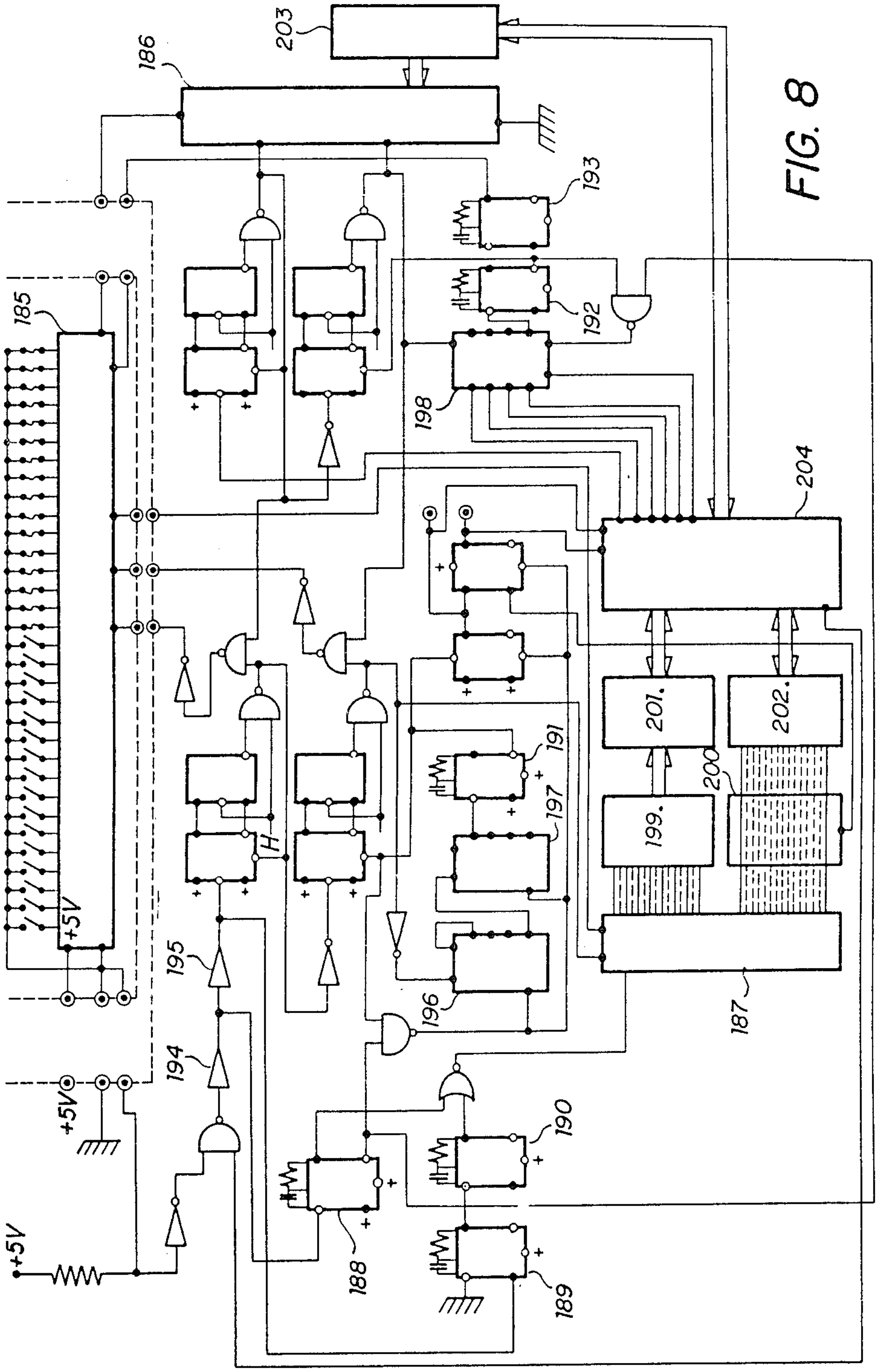

FIG. 8 shows a system for programming the code loading having a variable number of writing bits and independent writing control bits, 185 and 186 are parallel-series circulating registers, 187 is a series-parallel circulating register, 188, 189, 190, 191, 192 and 193 are monostables, 194 and 195 are time-switches, 196,197,198 are counters, 199 shows protege memories, 200 shows a comparator, 201,202,203 are PIAs and 204 is a microprocessor. The other elements, shown in a conventional diagrammatical manner, are trigger circuits, gates or inverters.

Figure 9:
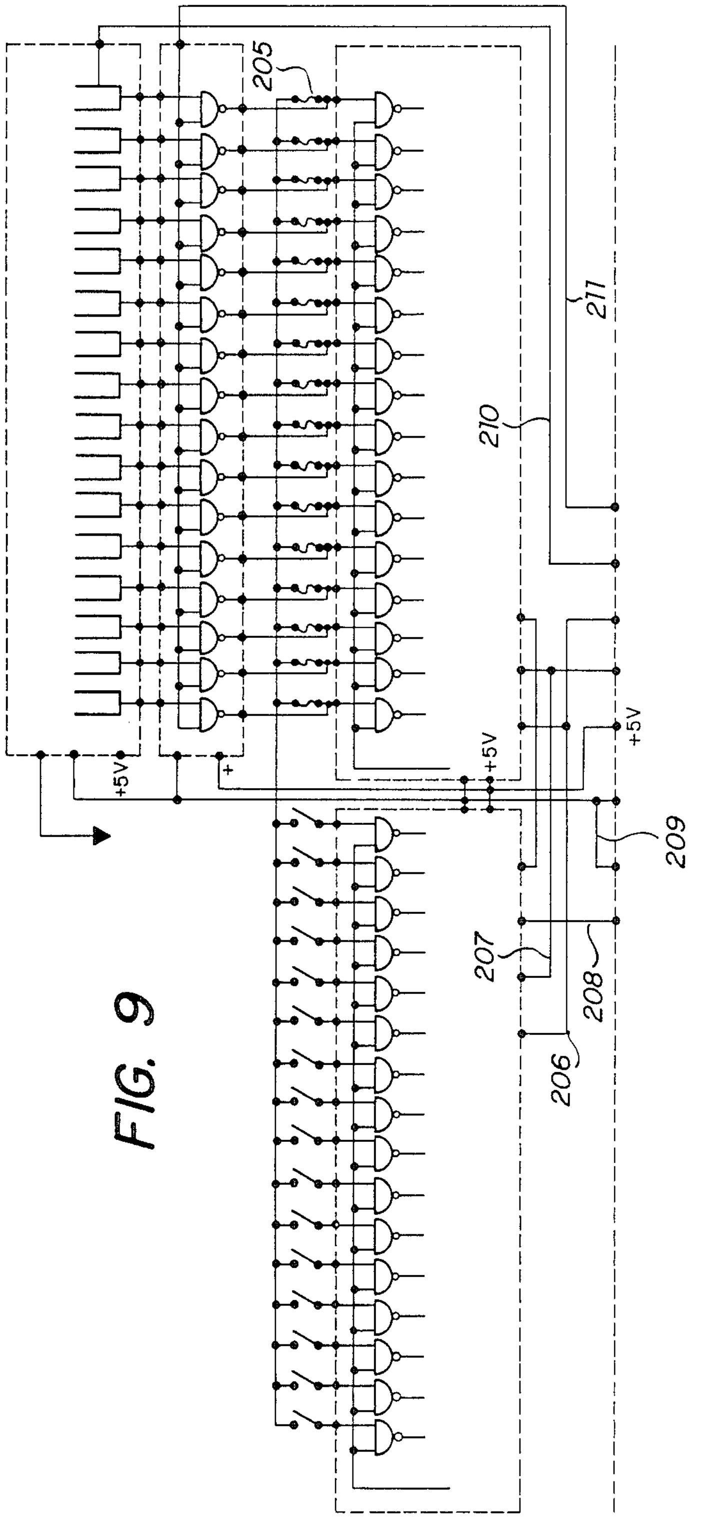

FIG. 9 shows an integral system in the key for loading a random code having 16 fixed bits and 16 random bits, 205 bring the fuses, 206,207,208,209,210 and 211 indicating the loading, clock, output, earth, input and fuse control conductors.

Figure 10:
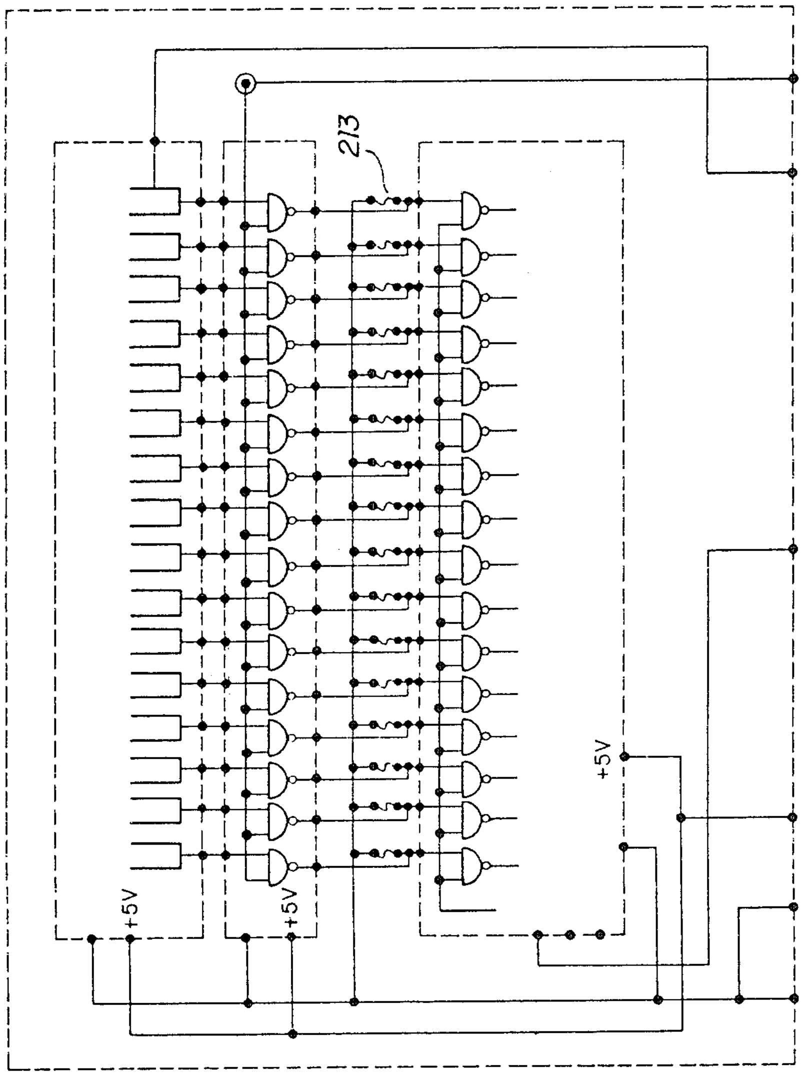

FIG. 10 shows an integral system for loading a random code onto 16 bits but which may be carried on as many bits as allowed by the integration, 213 being the fuses, conventional earth, load and output terminals etc. being shown in a very diagrammatical manner.

Figure 11:
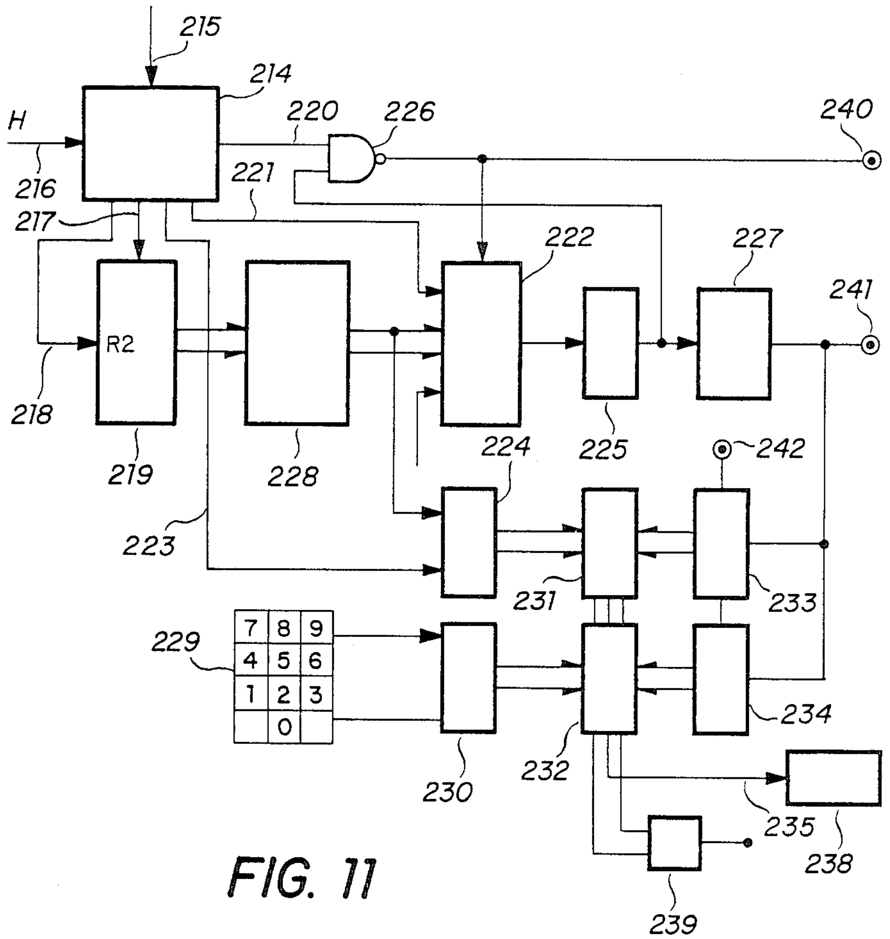
Figure 12:
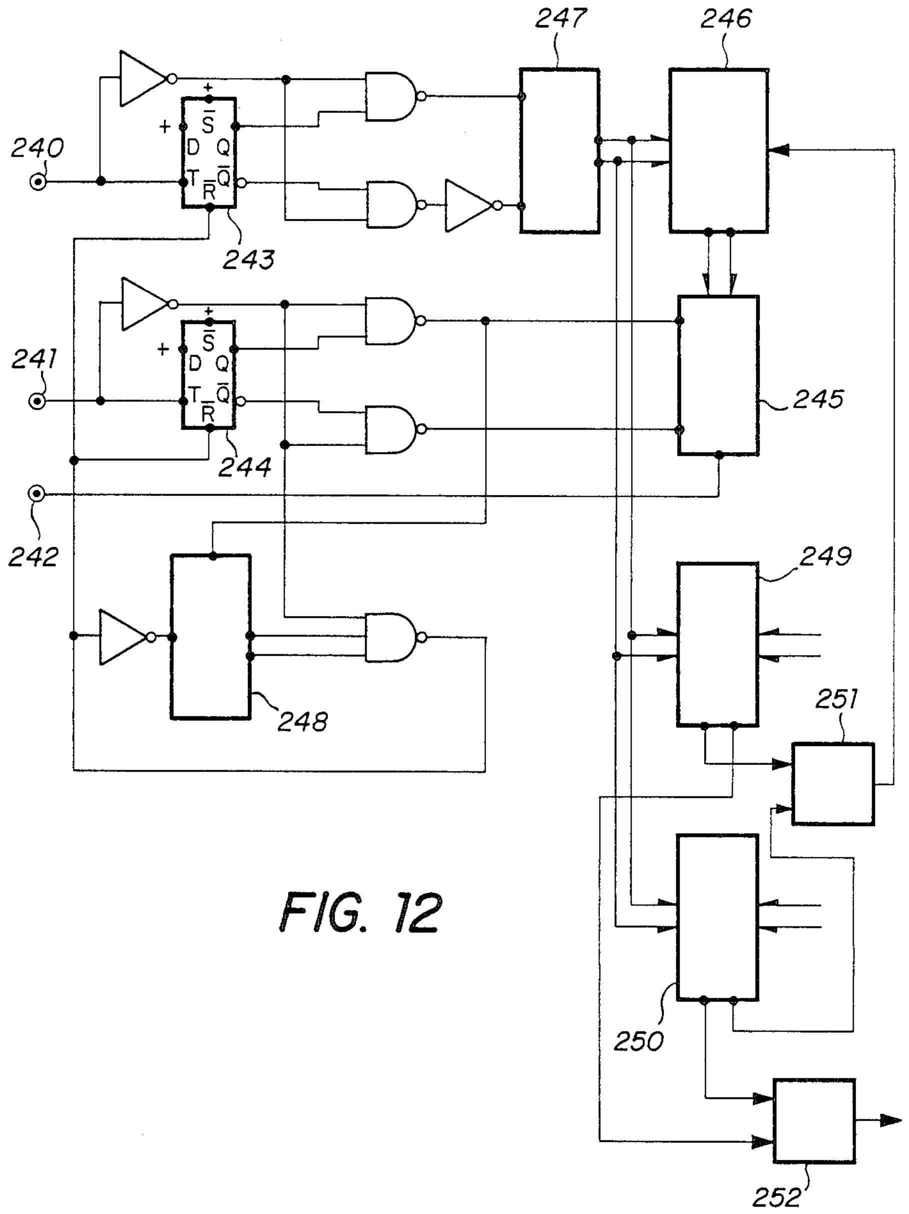

According to the variant shown in FIGS. 11 and 12 the fixed part comprises a memory containing the code to be forwarded to the mobile part, and controlling the pre-positioning counter/decounter which allows the necessary number of bits to be sent to an address in the mobile part.

A memory in the mobile part may supply data to the address which is sent by means of a parallel-series circulating register to the fixed part to effect a comparison.

The memory in the fixed part may consist of a ROM, EPROM or EEPROM and the memory in the mobile part may consist of an EEPROM.

The invention will be better understood with reference to the accompanying drawings (FIGS. 11 and 12), given by way of example.

The fixed part consists of a base logic 214 having a sequence launching input 215, a clock input 216, two outputs 217,218 for supplying a counter 219, a loading output 220, a feeding output 221 of a prepositioning counter 222 and an output 223 for controlling a latch 224. A circuit 225 for detecting the passage to zero is fed by the output of the counter 222 and feeds itself, a NAND gate 226 and a circuit 227 for launching a reading clock.

The fixed part also comprises a ROM, PROM or EPROM memory 228, which is supplied by the counter 219 and supplies the counter 222 and the latch 224.

A keyboard 229 supplies a second latch 230, the latches 224 and 230 themselves supplying the comparators 231 and 232 respectively, the facing inputs which are supplied by the series/parallel registers 233,234. The three outlets 235,236 and 237 of the comparator 232 respectively go to an agreement circuit 238 and a disagreement circuit 239, the output of which supplies the error counter which is not shown in this Figure.

The corresponding mobile part shown in FIG. 12 comprises a load input terminal 240, a clock input terminal 241 and a signal output terminal 242, clearly corresponding to the terminal indicated by the same reference numerals in FIG. 11. Terminals 240 and 241 respectively attack two trigger circuits 243 and 244 and the terminal 242 attacks a parallel-series register 245 receiving the data from an EEPROM memory 246, the output from the register 245 supplying the terminal 242. The circuit also comprises two counters, the first 247 of which supplies the memory 246 on the one hand and two comparators 249 and 250 on the other hand. The comparators 249 and 250 supply two circuits 251 and 252, the outputs of which respectively serving to write the alarms in a memory zone 246 which is reserved for blocking the memory after a certain number of fraudulent attempts and to give a writing agreement to a memory which is reserved for counting.

The memory 228 of the fixed part contains the code to be sent to the mobile part and controls the counter/-decounter 222 which enables the necessary number of bits for an address to be sent to the mobile part, this address being decoded in the mobile part.

The EEPROM 246 of the mobile part provides this address with data which is sent by means of the register 245 to the fixed part where a comparison is effected in the comparators 249 and 250, as in the embodiments of the main patent. In the mobile part, the input of the comparators 249 and 250, unlike the input fed by the counter 247, receives the minimum and maximum addresses respectively allowing a fraudulent search of the code to be detected by two possibilities; either to stop the errors or to block the memory at the end of certain amount of errors.

FIGS. 13 and 14 respectively illustrate a synoptical view and a detailed view of a last embodiment.

It can be seen in FIGS. 13 and 14 that the fixed part or receiver 253 and the mobile part or emittor 254 are connected by means of the COPS 255 256, between which data is conveyed in 257; the series connections are established at 258 and they supply at 259. The COPS 255 co-operate with an EPROM or EEPROM 260 by means of an address bus 261, a data bus 262 and likewise the COPS 256 co-operate with an EPROM or EEPROM 263 by means of an address bus 264, a data bus 265 and a control line R/266.

The block diagram of the COPS shown in FIG. 14 comprises a decoding logic and an instruction control logic 267, a control circuit I/O 268, a programme address memory 269, a programme counter 270, a two-level cell 271, co-operating with a reset to zero logic 272, a data address memory 273, an accumulator 274 arithmetical and logical unit 275 and various registers and drivers 276 to 282.

It also comprises a clock pulse generator 283 and a divider 284.

It can be seen in FIG. 13 that the EPROM memories and ROM memories are programmed to obtain the given organigramme and chronogramme, with the difference that the load bits LOAD are programmed by a batch of eight bits, on account of the organisation of the EPROM memory which is selected in this particular case ($2048\times8$), but it should be understood that it is also possible to use EPROM memories having a different organisation.

The programming would change the ROM memory of the COPS, but the result would obviously be the same. By using the calculating unit ALU 274 and the ROM 269 unit which are integrated into the COPS of the mobile part 254 this allows the equivalent of the clock modulation to be carried out and by programming the ROM in the fixed part 253 this allows the load modulation of the mobile part to be created, the primary programming being carried out in the EPROM memory of the mobile part.

The programming resulting from the different modulations produces a code which is programmed into the EPROM 260 memory of the fixed part 253 in place of the circulating registers of the above system.

The arithmetical logical unit of the COPS 255 of the fixed part 253 effects a comparison, the whole unit being controlled by the ROM memory of the fixed part. In this variant, given the use of a EPROM 260 in the fixed part and in the mobile part, it is possible to modify the code in this EPROM 263, according to needs and circumstances.

A code change may be programmed into the ROM of the fixed part of which controls the code change of the EEPROM of the fixed part and that of the mobile part. According to the principle of the EEPROM selected, in this case UVERASABLE PROM, the code change is limited because the code can only be incremented. It is nevertheless clear that the EEPROM technical memories, such as mentioned in previous patents FR No. 81.09452, 81.09453, 83.08099 and 83.10201, allow the code to be changed in a more flexible manner and for a virtually infinite period of time.

The use of these two groups COPS EPROM or EEPROM allows a considerable number of combinations in as far as the description in the previous documents of the applicant are applied.

What is claimed is:

1. An electronic identification device comprising a mobile part and a fixed part, wherein said mobile part comprises a pre-programmed passive memory zone containing an electronic identification code and a readable memory, wherein said passive memory zone is connected to said readable memory, wherein said mobile part is adapted to be coupled to said fixed part, wherein said fixed part comprises:

means for supplying electric power to said device;

loading electronic means for supplying at least one loading pulse to said mobile part, which causes said electronic identification code to be loaded into said readable memory, a second memory;

reading electronic means for reading the content of said readable memory of said mobile part and transferring said content of said readable memory into said second memory of the fixed part;

comparison means for comparing said content of said readable memory with a code contained in said fixed part;

transmitting means for supplying before the reading operation of said readable memory a set number of preliminary pulses to said mobile part, wherein said mobile part further comprises:

modification means for receiving said set number of preliminary pulses and for effecting with each preliminary pulse a modification of the contents of said readable memory; and destruction means for destroying the content of the pre-programmed passive memory zone of said mobile part in response to a destruction signal corresponding to a predetermined number of unsuccessful attempts to receive in the mobile part said number of preliminary pulses.

2. A device according to claim 1, wherein the said destruction circuit is adapted to have a voltage applied thereto, wherein said destruction circuit comprises a counter which is incremented each time said voltage is applied and which is reset to zero each time said number of preliminary pulses is received in the mobile part, the said counter emitting, after number N of times said voltage is applied without in the meantime being reset to zero, an output signal which causes said destruction.

3. A device according to claim 2, in which a determined number of load pulses are necessary to load the code into the memory so that it may be read, and wherein the said destruction circuit comprises a divider which receives the said load pulses and emits an output pulse when the said determined number of load pulses has been received, this output pulse serving to reset the said counter to zero.

4. A device according to claim 1, wherein said fixed part comprises a keyboard for introducing a part of said code contained in said fixed part during the operation of said electronic identification device.

5. A device according to claim 1, wherein said passive memory zone of the mobile part comprises fuses which may be selectively destroyed to effect said preprogramming and which are all adapted to be destroyed.

6. A device according to claim 1, wherein the fixed part comprises a third memory containing another code and a pre-positioning counter/decounter, wherein said another code is adapted to be sent to the mobile part and controls said pre-positioning counter/decounter, wherein said pre-positioning counter-decounter comprises means for sending an address to the mobile part.

7. A device according to claim 6, wherein a memory in the mobile part supplies data to the address which is sent by means of a parallel-series circulating register to the fixed part to effect a comparison.

8. A device according to claim 7, wherein the memory in the fixed part consists of a ROM, EPROM or EEPROM and the memory in the mobile part consists of an EEPROM.

9. The device according to claim 1 wherein said loading electronic means supplies before the reading operation a first set number of preliminary pulses to said mobile part, wherein said readable memory of the mobile part is subdivided into a predetermined number of memory elements connected together but loaded independently, wherein said mobile part further comprises loading control means for producing the successive loading of each memory element following each of said first set number of preliminary pulses, wherein said modification means comprises means for modifying the content of said readable memory in response to a sequence of said first set of preliminary pulses of a number exceeding the number of memory elements.

10. The device according to claim 1 wherein said readable memory comprises an input portion, an output portion, means for feeding output from said output portion to said input portion, and a logic gate for enabling transfer of the contents of said readable memory to said second memory of said fixed part only after transmission of said set number of preliminary pulses.

11. A device according to claim 10 wherein said fixed part further comprises:

programmable counting means cooperating with said reading means for supplying, before the reading operation, a second set number of preliminary pulses to said mobile part;

wherein said modification means comprises means for modifying the content of said readable memory in response to a sequence of said second set number or preliminary pulses;

and wherein said destruction signal corresponds to an incorrect number of said first set number of preliminary pulses received in the mobile part.

12. A device according to claim 11 comprising a logic gate for enabling transfer of the contents of said readable memory to said second memory of said fixed part only after transmission of said second set number of preliminary pulses.

13. A device according to claim 11 comprising a plurality of secondary fuses which may be selectively destroyed to effect a pre-programming, said secondary fuses being mounted in a parallel way for transmitting or not transmitting, depending upon their respective status, each of said first set number of preliminary pulses to said readable memory in such a way as to further modify the contents of said readable memory; said secondary fuses being all adapted to be destroyed when said passive memory zone is destroyed.

14. A device according to claim 1 wherein the fixed part further comprises:

means for repeating a predetermined number of times the operations of supplying said set number of preliminary pulses, of reading and transferring the content of said readable memory into said second memory of the fixed part and of comparing the content of said readable memory with said code contained in the fixed part;

means for counting the number of negative results of said comparison;

and means for outputting an agreement signal in response of a given ratio of negative results of said comparison versus the number of repeated operations.

15. The device according to claim 1 wherein the fixed part further comprises:

means for modifying said set number of preliminary pulses at each attempt of obtaining a matching result in the said comparison means between said content of said readable memory and said code in said fixed part; and means for counting a pre-determined number of said attempts, wherein said mobile part further comprises means for correspondingly modifying at each attempt the contents of said readable memory, wherein said device further comprises means for computing a statistical value of satisfactory results after said pre-determined number of attempts and for outputting an agreement signal in response to a given level of said statistical value.

16. An electronic identification device comprising:

(a) a mobile key part comprising:

(1) a pre-programmed static memory containing an electronic ID code;

(2) a readable memory;

(3) a counter responsive to loading pulses for transferring the contents of the static memory to the readable memory; and (4) a destruct circuit connected to said static memory for selectively producing a destruct signal that destroys said static memory;

(b) a non-mobile lock part for receiving said key part and comprising:

(1) memory means containing a pre-selected code word;

(2) buffer means for receiving data from said readable memory after said lock receives said key part;

(3) a comparator for comparing data contained in said buffer means with data contained in said memory means and producing a control signal signifying a match between the data in the memory means and the data in the buffer means;

(4) pulse generator means responsive to the lock part receiving said key part for first, supplying load pulses to said counter, whereby the contents of said static memory are transferred to the readable memory, and thereafter supplying read pulses to said readable memory which responds by producing a train of pulses by which data in said readable memory are transferred to said buffer means; and (c) said destruct means being responsive to load pulses applied to said counter for producing a destruct signal when more than a pre-determined number of load pulses are applied to said counter.

* * * * *